Oct. 17, 1944.  F. WIDOE  2,360,459
BRAKE SHOE TOOL
Filed Dec. 10, 1943
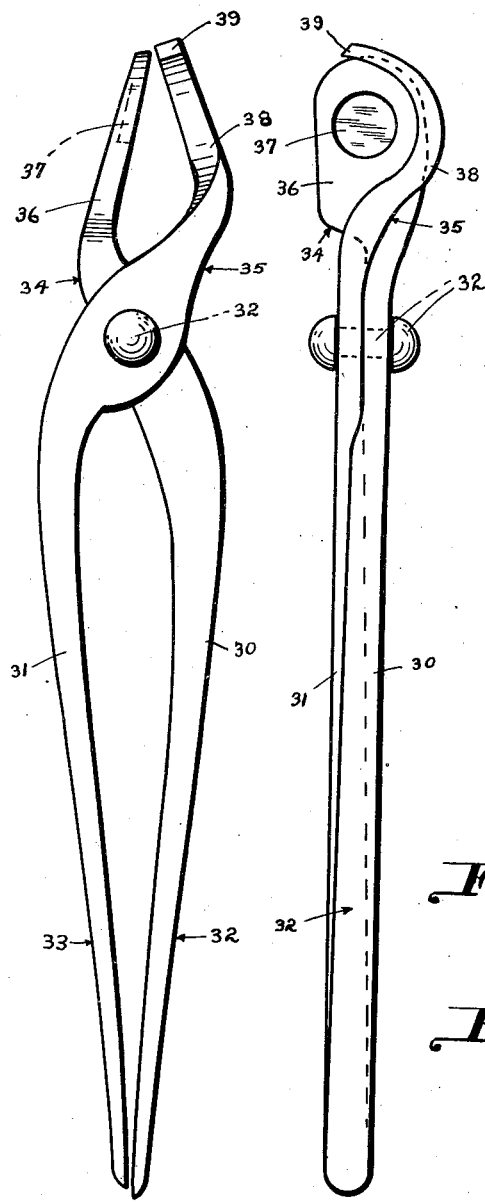
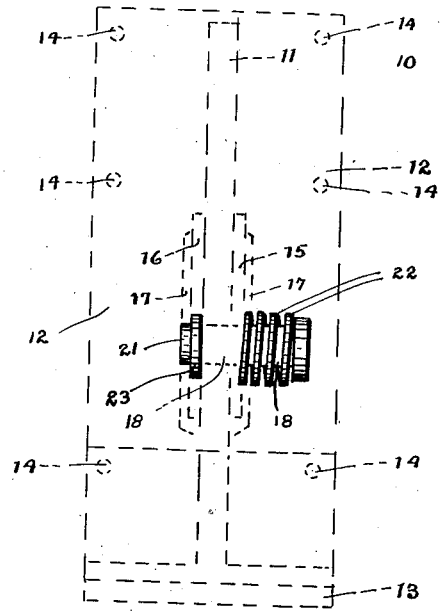
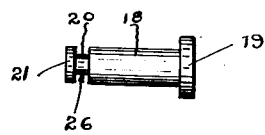
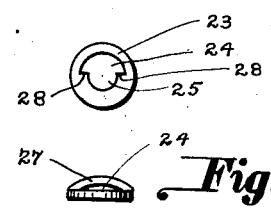
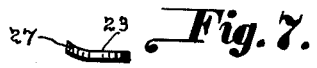
Fig. 1.  Fig. 2.
Inventor
Frederick Widoe
By
Arthur H. Sturges, Attorney Patented Oct. 17, 1944

2,360,459

UNITED STATES PATENT OFFICE 2,360,459

BRAKE SHOE TOOL

Frederick Widoe, Omaha, Nebr.

Application December 10, 1943, Serial No. 513,758

2 Claims. (Cl. 29—268)

The present invention relates to automobile accessories and more particularly to brake shoes.

It is an object of the invention to provide a tool for peforming a particular operation during a re-lining of automobile brake shoes, the latter being of a particular construction.

A further object of the invention is to provide a device for the purpose described, the parts of which are so constructed and arranged that slippage of the new tool with respect to the work is prevented at times when it is applied for exerting pressure against the urge of a locking spring of a brake shoe pin.

Other and further objects and advantages of the invention will be understood from the following detailed description, reference being had to the accompanying drawing in which:

Figure 1 is a side view of the new tool.

Figure 2 is an edge view thereof.

Figure 3 is an end elevation of a brake shoe, the latter being shown by dotted lines, certain adjunct parts of the shoe being shown in full lines.

Figure 4 is a side view of a pivot pin employed in conjunction with said shoe.

Figure 5 is a face view of a locking washer.

Figure 6 is a side elevation of said washer.

Figure 7 is a view similar to Figure 6 and showing the washer turned at an angle of 90 degrees with respect to the showing thereof in Figure 6.

Referring to Figure 3, 10 indicates generally a brake shoe of a "Chevrolet" automobile. The shoe is T shaped in cross section, having a main body portion or rib 11. The shoe is segmental in side elevation having an arcuate inner surface 12, said rib being disposed approximately midway between the side edges of the surface 12 and inwardly therefrom. The shoe is provided with a frictional brake lining 13. The lining is secured to the shoe in a well known manner by means of rivets 14. Adjacent one end of the shoe like links 15 and 16 are secured to the rib 11 at opposite sides of the latter by means of a pin, not shown, disposed through said rib and ends of the links. The ends of the links which are opposite to their attachment to the rib, are provided with apertures for receiving a further pin therethrough for attaching the shoe to its oppositely disposed mate within the housing of a brake drum. The links 15 and 16 are provided with outwardly disposed reinforcing ribs 17.

The brake shoe assembly further includes a pin 18, best shown in Figure 4. The pin 18 is disposed through the rib 11 and the links 15 and 16, as shown in Figure 3.

The pin 8 is provided with a head 19 and an annular kerf 20. An annular detent-boss 21 is provided at the end of the pin opposite its head 19. A spring 22 is disposed about the main body portion of the pin 18 in use, as shown in Figure 3, and said spring normally urges the head 19 of the pin away from the rib 11 at all times during use. The pin 18 is maintained in a position of use by means of a detent washer 23 in conjunction with the spring 22.

Referring to Figure 5, the washer 23 is provided with a bore, the latter having two different diameters. The portion 24 of the bore is semi-circular in plan and of slightly greater diameter than the end 21 of the pin 18. The other semi-circular bore portion 25 is of lesser diameter than the bore portion 24. The bore portion 25 is of the same diameter as the annular wall 26 of the kerf portion of the pin 18. As best shown in Figures 6 and 7, the washer 23 is provided with an upturned end 27. The above described brake shoe and its adjunct parts are old and well known, being conventionally employed in conjunction with several types of automobiles, particularly "Chevrolets."

As best shown in Figure 3, the pin 18 is disposed through the rib 11 and through the links 15 and 16, said pin 18 being maintained in position by means of the shoulders 28 of the washer 23, being seated under the detent-boss 21 of the pin 18 at times when the wall of the bore 25 of lesser diameter of the washer 23 is disposed snugly against the annular wall 26 of the pin, the spring 22 at this time maintaining the parts in a position of use and preventing a detachment thereof incident to vibration generated by the travel of the automobile.

It is well known that brake shoe linings wear out during use, whereupon the shoe must be removed from the brake drum and the several adjunct parts of the shoe disassembled so that the shoe will fit into a re-lining machine for applying and riveting a new lining attached to the brake shoes in a well known manner.

As heretofore practiced, a use of an appreciable amount of time and labor was necessitated in order to free the washer 23 from the pin 18 and from the strong urge of the spring 22 during a brake shoe re-lining operation, since a mechanic would upset the shoe in a vise or the like and otherwise consume a half hour of labor time for a detachment of the links 15 and 16 from a shoe, said detachment necessitating a removal of the pin 18, and the present invention aims to obviate the undesirable features of the prior practice by providing a tool for facilitating a removal of the pin 18 from a brake shoe by readily freeing the washer 23 from the urge of the spring 22.

Referring to Figures 1 and 2, the new tool includes tongs having legs 30 and 31, said legs being elongated for purposes later described.

The legs cross one another as shown in Figure 1, being secured together by means of a pivot pin 32. The pivotal attachment is closer to one end of the legs than their other end, for providing hand-grip portions 32 and 33 at the longer ends of the legs and jaw members 34 and 35 at the shorter ends of the legs.

The outer end of the jaw member 34 includes a transversely flared portion 36 for providing an anvil, the latter preferably being provided with a recess 37 let into said flared portion from the inner surface thereof as shown in full lines in Figure 2 and by means of dotted lines in Figure 1. The recess 37 is annular in plan and of slightly larger diameter than the head 19 of the pin 18 for receiving said head therein.

The jaw 35 includes an offset portion 38 which, as best shown in Figure 2, is approximately semicircular in plan, the terminal end 39 of the arcuate offset portion 38 is spaced away from the outer free end of the jaw 34 and spaced an appreciable distance from the recess 37 at times when the end 39 is disposed towards the flared portion 36 of the jaw 34, as shown in Figure 1. The radius of the semi-circular portion 38 is of a greater diameter than the washer 23, so that the jaw 35 does not touch the washer during application of the tool as later described. As shown in Figure 1, the semi-circular portion 38 of the jaw 35 is disposed approximately at a right angle with respect to the main body portion of the jaw 35, whereby during use the end 39 and adjacent portion of the jaw 35 spans over the reinforcing rib 17 of the link 16 during an application of the new tool to the work as later described.

In use the flared portion 36 of the jaw 34 is disposed against the head 19 of the pin 18 and the operator causes the jaw 35 to be closed toward the jaw 34, the jaw 35 bearing against the work at this time without touching the washer 23. The operator now applies pressure to the legs of the tongs for compressing the spring 22 and causing the washer 23 to be moved away from the rib 11 of the brake shoe or work, whereupon the operator may insert a screw driver bit under the upturned end 27 of the washer for causing the latter to become disengaged from the pin 18.

As shown in Figure 4, the head 19 of the pin 18 is of rectangular outline in side elevation, and for this type of pin an employment of the recess 36 is not always necessary. However, many of the pins 18 are provided with a head 19 which is slightly arcuate in cross section at the outer end thereof, and for this type of pin greater speed is attained in a detachment thereof from the brake shoe assembly by causing the head 19 of the pin 18 to be seated in the recess 37 at the time the spring 22 is compressed for preventing slippage of the anvil with respect to the work.

I claim:

1. A device for moving a pin of a brake shoe against the urge of the spring thereof for permitting a removal of the detent washer of said pin comprising tongs having legs pivotally attached together, said attachment being closer to one end of said legs than the other for providing hand-grips at the longer ends and jaw members at the shorter ends, one of said jaws having a flared end provided with a recessed inner surface for receiving the head of said pin in said recess for preventing slippage of the device with respect to the work, the other jaw having an offset hook at its end arranged to partially encircle said washer and bear against said work at times when said jaws are moved towards each other for compressing said spring.

2. A device for moving the pin of a brake shoe against the urge of the spring thereof for permitting a removal of the detent washer of said pin compressing tongs having legs pivotally attached together, said attachment being closer to one end of said legs than the other for providing handgrips at the longer ends of jaw members at the shorter ends, one of said jaws providing means for receiving the head of said pin for preventing slippage of the device with respect to the work, the other jaw having an offset hook at its end arranged to partially encircle the washer and bear against said work at times when the jaws are moved towards each other for compressing said spring.

FREDERICK WIDOE.